M. F. WILLIAMS.
CRUSHER AND PULVERIZER.
APPLICATION FILED APR. 1, 1907.
No. 904,907.
Patented Nov. 24, 1908.
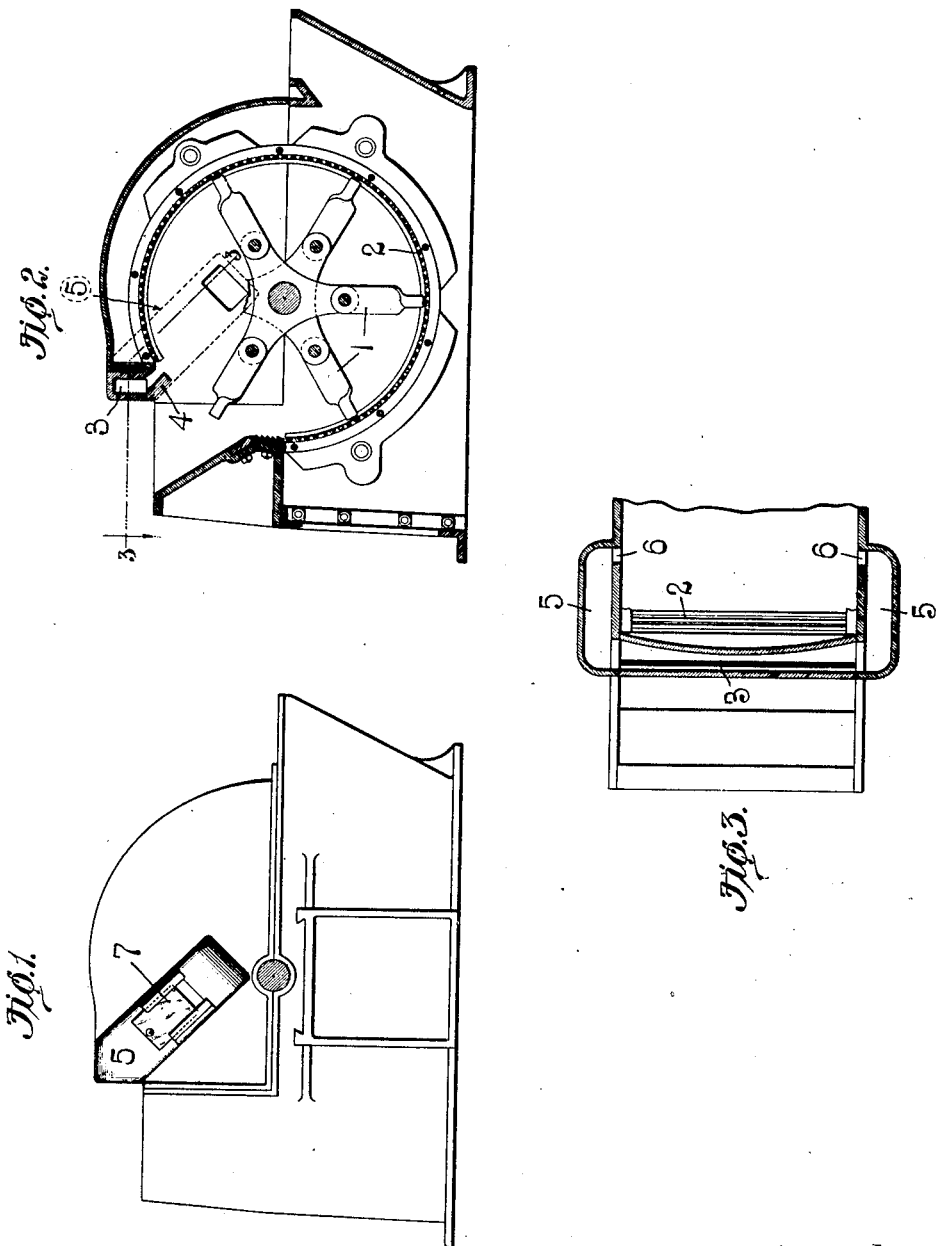
Witnesses:
Geo. R. Kadson.
L. A. McCauley.
Inventor:
Milton F. Williams.
By Bakewell Cornwell Attys.

UNITED STATES PATENT OFFICE.

MILTON F. WILLIAMS, OF ST. LOUIS, MISSOURI, ASSIGNOR TO WILLIAMS PATENT CRUSHE & PULVERIZER COMPANY, OF ST. LOUIS, MISSOURI, A CORPORATION OF MISSOURI.

CRUSHER AND PULVERIZER.

No. 904,907.  Specification of Letters Patent.  Patented Nov. 24, 1908.

Application filed April 1, 1907. Serial No. 365,709.

*To all whom it may concern:*

Be it known that I, MILTON F. WILLIAMS, a citizen of the United States, residing at St. Louis, Missouri, have invented a certain new and useful Improvement in Crushers and Pulverizers, of which the following is a full, clear, and exact description, such as will enable others skilled in the art to which it appertains to make and use the same, reference being had to the accompanying drawings, forming part of this specification, in which—

Figure 1 is a side elevational view of my improved machine; Fig. 2 is a longitudinal vertical sectional view through the same; and Fig. 3 is a horizontal sectional view on the line 3—3 of Fig. 2.

This invention relates to a new and useful improvement in crushers and pulverizers, the object being to provide means to prevent dust and particles of ground material from issuing through the mouth or feed end of the machine.

In the accompanying drawings I have shown the well-known type of Williams mill such as illustrated in Patent No. 589,236, granted to me August 31, 1897, to which my improvement is applicable, but there are other types of mills to which my improvement is equally applicable, and therefore I do not wish to be understood as confining myself to the application of my improvement to the Williams mill.

In the operation of the Williams mill the revolving beaters or hammers 1 coöperate with a concentrically arranged grinding surface 2 which may be in the form of a perforated plate or transversely arranged bars through the openings in which grinding surface the material passes, after it is reduced by the revolving beaters. I have found that in operation the revolving beaters act substantially as a fan or blower, that is, if an opening is made near the axis of rotation the tendency is to draw any air at that point, the air passing outwardly with particles of reduced material through the openings in the grinding surface. I utilize this fan principle to displace the air near the feed end of the machine, drawing said air back into the eye of the machine, and the suction thus created at or adjacent the mouth or feed end of the machine has a tendency to draw the particles of material back into the machine. This prevents air and dust from passing out the mouth of the machine.

In the drawings 3 indicates a chamber located adjacent the feed end or mouth of the machine, said chamber having an opening communicating with the interior. This opening is preferably in the form of a transversely extending slot narrowest at its center and increasing in width toward each side of the machine so as to provide a wide entrance opening at the sides of the machine where the greatest quantity of material collects. The chamber referred to is preferably formed in a casting having a depending lip 4, which lip practically serves as a skimmer in that it is located just outside the path of the revolving beaters, and any particles of material striking the lip are deflected into the chamber. The ends of chamber 3 are connected by side passages 5, preferably arranged exterior the side frames of the machine, said side passages communicating with the interior of the machine through openings 6.

In operation air is drawn through the side passages into the eye of the machine and consequently pressure in chamber 3 is reduced, and this reduction of pressure tends to draw into said chamber dust and other particles of material which would otherwise find an exit through the mouth or feed end of the machine.

The suction of chamber 3 is assisted by the deflecting lip 4, but it is obvious that so far as this lip is concerned it could be dispensed with. In the event that it is found that the suction in chamber 3 is too great, a valve 7 may be provided in the side passages, see Fig. 1, which will permit air from the exterior to be drawn into the side passages and thus reduce the suction in said chamber 3.

I am aware that minor changes in the construction, arrangement and combination of the several parts of my device can be made and substituted for those herein shown and described without in the least departing from the nature and spirit of my invention.

Having thus described the invention, what is claimed as new and desired to be secured by Letters Patent is:

1. A machine of the character described, provided with a casing having a feed opening, a member arranged at the rear side of said feed opening and provided with a chamber and a slot that establishes communication between the chamber and the casing, a grinding surface which terminates at the rear edge of said slot, a revolving beater arranged inside of the grinding surface, a lip extending inwardly from the front edge of the slot in said member for deflecting material into said chamber, and means for conducting the material which collects in said chamber back into the casing of the machine; substantially as described.

2. A machine of the character described, provided with a casing having a feed opening, a hollow member arranged at the rear side of said feed opening and provided with a transversely extending slot that increases in width from its center toward its opposite ends, a lip projecting inwardly from the front edge of said slot to deflect material into said hollow member, a grinding surface terminating at the rear edge of said slot, a revolving beater arranged inside of said grinding surface, and means for conducting the material which collects in said chamber back into the casing of the machine; substantially as described.

In testimony whereof I hereunto affix my signature in the presence of two witnesses, this 28th day of March, 1907.

MILTON F. WILLIAMS.

Witnesses:
F. R. CORNWALL,
GEORGE BAKEWELL.